United States Patent
Pau et al.

(10) Patent No.: US 10,127,454 B2
(45) Date of Patent: Nov. 13, 2018

(54) METHOD AND AN APPARATUS FOR THE EXTRACTION OF DESCRIPTORS FROM VIDEO CONTENT, PREFERABLY FOR SEARCH AND RETRIEVAL PURPOSE

(71) Applicants: RAI RADIOTELEVISIONE ITALIANA S.P.A., Rome (IT); STMICROELECTRONICS S.R.L., Agrate Brianza (MB) (IT)

(72) Inventors: Danilo Pau, Sesto San Giovanni (IT); Alberto Messina, Turin (IT)

(73) Assignees: RAI Radiotelevisione Italiana S.P.A., Rome (IT); STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 14/414,048

(22) PCT Filed: Jul. 11, 2013

(86) PCT No.: PCT/EP2013/064729
§ 371 (c)(1),
(2) Date: Jan. 9, 2015

(87) PCT Pub. No.: WO2014/009490
PCT Pub. Date: Jan. 16, 2014

(65) Prior Publication Data
US 2015/0154456 A1 Jun. 4, 2015

(30) Foreign Application Priority Data

Jul. 11, 2012 (IT) .............................. MI2012A1210

(51) Int. Cl.
*G06K 9/00* (2006.01)
*G06K 9/46* (2006.01)

(52) U.S. Cl.
CPC ....... *G06K 9/00744* (2013.01); *G06K 9/4671* (2013.01)

(58) Field of Classification Search
None
See application file for complete search history.

(56) References Cited

U.S. PATENT DOCUMENTS

| 7,773,670 B1 * | 8/2010 | Puri | ..................... H04N 19/124 375/240 |
| 2006/0062474 A1 * | 3/2006 | Paschalakis | ......... G06K 9/4652 382/190 |

(Continued)

OTHER PUBLICATIONS

International Search Report and Written Opinion dated Aug. 6, 2013, issued in PCT Application No. PCT/EP2013/064729, filed Jul. 11, 2013.

(Continued)

*Primary Examiner* — Fred Hu
(74) *Attorney, Agent, or Firm* — Workman Nydegger

(57) ABSTRACT

A method for extraction of descriptors from video content, includes the following steps: a Key Frame Extracting step, applying a local descriptors-based approach to select pictures of the incoming video as key frames that are representative of a temporal region of the video which is visually homogeneous; a Content Analysis step, analysing the content of the key frames and classifying image patches of the key frames as interesting or not for the extraction of descriptors; a Descriptors Extracting step, extracting compact descriptors from the selected key frames, and defining a set of surrounding images also on the basis of input received from the Content Analysis step; a Temporal Coding step, multiplexing information about the time points at which said key frames have been extracted in the Key Frame Extracting step with the compact descriptors extracted in the Descriptors Extracting step, obtaining the descriptors.

13 Claims, 6 Drawing Sheets

(56) References Cited

U.S. PATENT DOCUMENTS

| | | | |
|---|---|---|---|
| 2008/0310731 A1* | 12/2008 | Stojancic | G06K 9/00711 382/195 |
| 2009/0304082 A1 | 12/2009 | Radhakrishnan et al. | |
| 2010/0007797 A1* | 1/2010 | Stojancic | G06F 17/30799 348/607 |
| 2010/0318515 A1* | 12/2010 | Ramanathan | G06F 17/30799 707/723 |
| 2011/0081075 A1 | 4/2011 | Adcock et al. | |

OTHER PUBLICATIONS

Masanori Sano et al., *Draft Text of ISO/IEC 15938-9:2005/FDAM1 Extensions to Profiles and Levels*, MPEG Meeting, ISO/IEC 15938-9:2005/DAM1, Nov. 19, 2011, No. m22607, pp. 50.

Raphael Troncy et al., *VAMP: A Service for Validating MPEG-7 Descriptions w.r.t. to Formal Profile Definitions*, Multimedia Tools and Applications, vol. 46, No. 2-3, Oct. 17, 2009, pp. 307-329.

Alberto Messina et al., *MPEG-7 Audio Visual Description Profile (AVDP)*, MPEG Meeting, Jul. 22, 2010, No. MPEG2010/M17744, pp. 22.

Julien Law-To et al., *Robust Voting Algorithm Based on Labels of Behavior for Video Copy Detection*, Proceedings of the 14th Annual ACM International Conference on Multimedia, Oct. 23, 2006, pp. 10.

Jian Lu, *Video Fingerprinting for Copy Identification: From Research to Industry Applications*, Proceedings of SPIE, International Society for Optical Engineering, vol. 7254, Jan. 19, 2009, pp. 16.

Miroslaw Bober et al., *Test Model 2: Compact Descriptors for Visual Search, video Subgroup*, ISO/IET JTC1/SC29/WG11, No. W12734, May 2012, pp. 28.

Duy-Nguyen Ta, et al., *SURFtrac: Efficient Tracking and Continuous Object Recognition Using Local Feature Descriptors*, IEEE Computer Society Conference on Computer Vision and Pattern Recognition (CVPR), Jun. 2009, pp. 8.

Martin A. Fischler et al., *Random Sample Consensus: A Paradigm for Model Fitting with Applications to Image Analysis and Automated Cartography*, Communications of the ACM, vol. 24, No. 6, Jun. 1981, pp. 381-395.

Federico Tombari et al., *Unique Signatures of Histograms for Local Surface Description*, ECCV 2010, pp. 14.

Federico Tombari et al., *A Combined Texture-Shape Descriptor for Enhanced 3D Feature Matching*, ICIP 2011, pp. 4.

Bin Zhao et al., *Image Segmentation with Topic Random Field*, ECCV 2010, Part V, LNCS 6315, pp. 785-798.

Huiping Li et al., *Automatic Text Detection and Tracking in Digital Video*, IEEE Transactions on Image Processing, vol. 9, No. 1, Jan. 2000, pp. 147-156.

Richard J. M. den Hollander et al., *Logo Recognition in Video Stills by String Matching*, Proceedings of ICIP 2003, pp. III-517-520.

Dengsheng Zhang et al., *Generic Fourier Descriptor for Shape-Based Image Retrieval*, Third CIRP International Seminar on Intelligent Computation in Manufacturing Engineering, 2002, pp. 425-428.

Dengsheng Zhang et al., *A Comparative Study of Three Region shape Descriptors*, Digital Image Computing Techniques and Applications, Jan. 22, 2002, pp. 6.

W. Nick Street et al., *A Streaming Ensemble Algorithm (SEA) for Large-Scale Classification*, KDD 2001, pp. 377-382.

Michael Calonder et al., *BRIEF: Binary Robust Independent Elementary Features*, ECCV 2010, Part IV, LNCS 6314, 2010, pp. 778-792.

Ramin Zabih et al., *Non-parametric Local Transforms for Computing Visual Correspondence*, In Proceedings of European Conference on Computer Vision, May 1994, pp. 151-158.

* cited by examiner

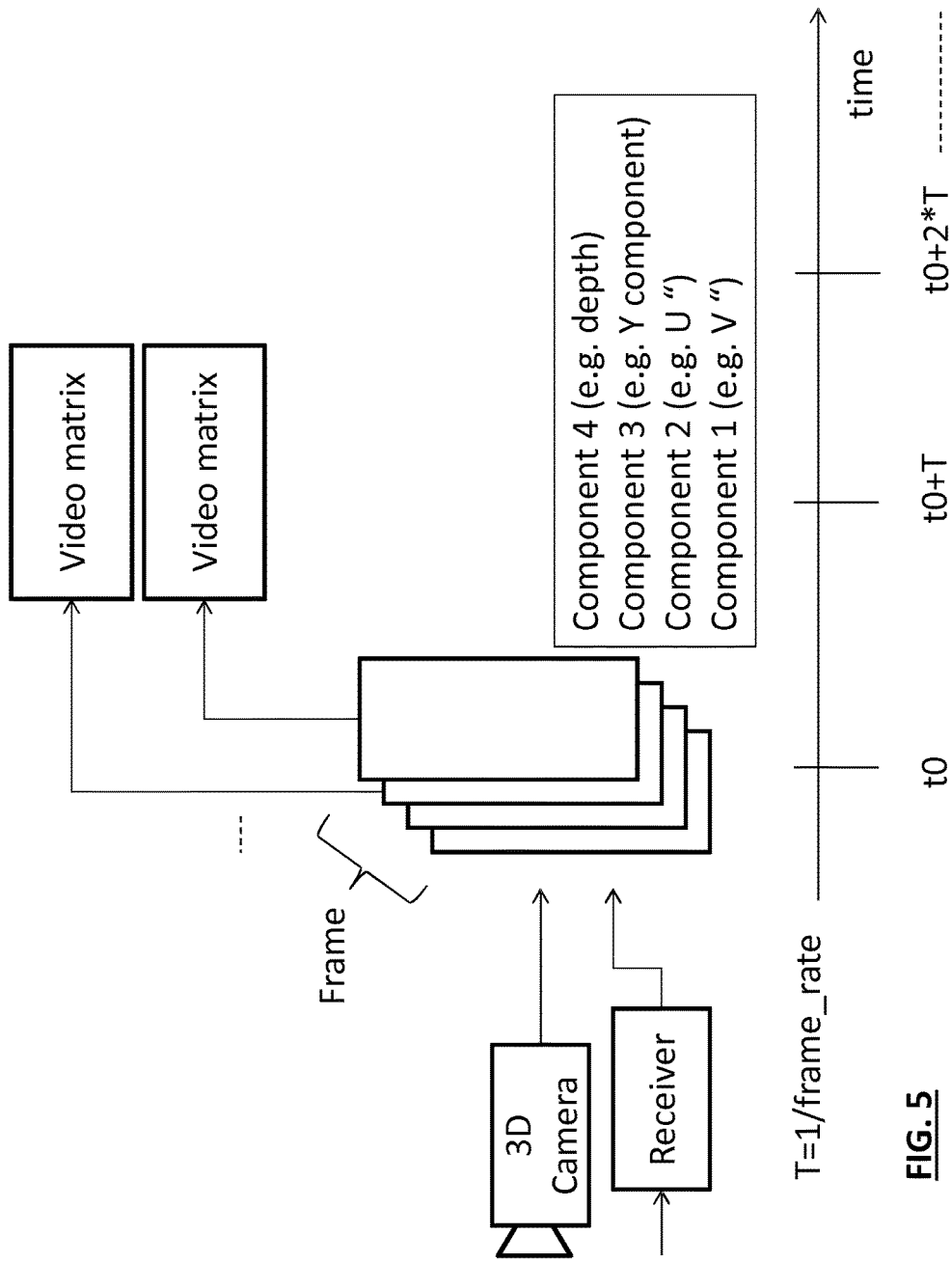

METHOD AND AN APPARATUS FOR THE EXTRACTION OF DESCRIPTORS FROM VIDEO CONTENT, PREFERABLY FOR SEARCH AND RETRIEVAL PURPOSE

FIELD OF THE INVENTION

The present invention relates to a method and apparatus for the extraction of descriptors from video content, preferably for search and retrieval purpose.

DESCRIPTION OF THE PRIOR ART

The increasing amount of digital video content produced and consumed every day and the need to search for objects, places and people which are part of the content, renders the problem of extracting compact descriptors from video signals with the purpose of using these descriptors in video search and retrieval applications more and more important.

The paper by Miroslaw Bober et al. "Test Model 2: Compact Descriptors for Visual Search, Video Subgroup", May 2012, Geneva, CH, ISO/IEC JTC1/SC29/WG11/W12734, which is hereby incorporated by reference in its entirety, discloses a model of MPEG Compact Descriptors for Visual Search (CDVS), providing in particular for an extraction module (FIG. 3) producing a compact descriptor composed of two main elements, namely a selected number of compressed local descriptors and a single global descriptor, representing the whole image.

This known model shows a potentially serious lack of efficiency when a video is processed, and this lack is higher as much as the video is temporally redundant (i.e., static), as temporal redundancy of video is not taken into account. In an individual visual shot adjacent frames are highly similar to each other: this feature should be taken into account to limit the amount of input information to be processed.

In addition, this known model provides for a Keypoint Selection block, in which a combination of statistical features is used which include distance from the image centre of the key points in order to weight, and hence to rank for selection, the key points before passing them to a vector quantisation block.

Although this approach has several benefits, among which the native adaptivity to the statistical nature of input data without the need of any kind of a-priori knowledge, however it is inherently missing several natural characteristics of video content, that should be important to predict areas of interest in video pictures from the semantic point of view (e.g., location of faces). Those missing natural characteristics of video content include:

Photography production grammars, and by extension their video counterparts, are often using more complex language constructs than the obvious notion which associates higher importance to central regions of the image;

Video content dynamism, imposed by content authors, is highly varying with genre, intention and target audience, so that the "centres" of attention are governed by directors exploiting the full range of possibilities. In addition, these centres of attention can be varying with the content timeline, depending on the specific content that is being shot (people, nature) or the shooting conditions (wide shots, close-ups).

For its underlying nature, video can be transformed through the application of several processing steps: dynamic image cropping (region of interest), motion warping, skimming and summarisation, superimposition of graphics. The rationale of applying such transformations rely in the need to adapt video content to the various delivery or publishing conditions, so that the results of these transformations, though physically different, can be considered equivalent to each other from the editorial and semantic point of view, i.e. for what concerns objects, people, locations that concur in building the "story" behind the video.

Another paper by Duy-Nguyen Ta et al. "SURFTrac: Efficient Tracking and Continuous Object Recognition using Local Feature Descriptors", IEEE Computer Society Conference on Computer Vision and Pattern Recognition (CVPR), June 2009, which is hereby incorporated by reference in its entirety, describes an algorithm (SURFTrac) for extracting descriptors of a series of digital video images. For the first image, the algorithm initializes a list of interest points by performing a full detection. The interest points are then updated and tracked upon receiving new images. The descriptors are for recognition purposes and the algorithm computes them as needed.

More specifically this algorithm first builds a map of SURF features extracted from a set of key-frame images captured from the surrounding environment. After extracting and matching SURF features of the first video frame with this map, the algorithm tracks those features locally in the subsequent frames. The key-frame which has the largest overlapping area with the current video frame is called key-node. The overlapping areas of nearby key-frames are updated in every frame based on their inter-frame homographies, and thus, the key-node is continuously switched to the most similar image in the database, allowing constant tracking and exploration of new regions in the video sequences.

In addition, during initialization, it computes the full SURF feature descriptors from the first video image and match them against images.

This method constructs an approximate nearest neighbour tree for all the image features in the database followed by geometric verification (RANSAC "RANdom SAmple Consensus" algorithm, as also referred to below). Upon successfully identifying the matching images, the best image is marked as the current key-node, and the set of images in-play is reduced to only those images that are connected by a path in the database. The database of images is organized as follows: V is a collection of images; G is an undirected graph where images forms the nodes in the graph, and the edges describe the relationships between the images. An edge between two images indicates a geometric relationship when these two images can be related through standard pairwise image matching. Each image is also further identified with one or more identifiers and two images sharing the same identifier are also connected by an additional edge. This organization is similar to a graph of images constructed for hierarchical browsing purposes. An example of the image graph is shown in FIG. 1(b) of the paper.

Once a key-node image and its object ID are identified, it can continuously match and update the key-node at a relatively low cost since fairly confident all potentially relevant objects are included in the current database sub-graph.

Therefore this method is based on a kind of object matching, which is not efficient, as it's not able to find key frames since it finds incrementally interest points, and it is not able to track a decremental number of points tracked from the $1^{st}$ frame, because it doesn't use the power of the descriptor matching tools, since it is based on probabilistic considerations which are sub-optimal in their precision-recall performances and because it uses an offline-built database which is memory consuming as well as computationally consuming when performing a search inside it.

US2010/0318515-A1 discloses a digital fingerprinting technique. That is a technology for enforcing digital rights policies whereby unique labels, known as digital fingerprints, are inserted into video or audio content prior to distribution, for tracing the distribution of multimedia content and protecting them from unauthorized redistribution. The fingerprint label identifies that video or audio clip containing it. A database of fingerprint signatures is created with the purpose to query the database to find the video or audio clip containing that signature. The query signatures are searched in the database using a fast similarity search procedure, to produce a candidate list of matching signatures. The candidate list is further analyzed to find the most likely reference matches. Signature correlation is performed between the likely reference matches and the query clip to improve detection accuracy. The purpose of the search is to find the video or audio clip containing that signature.

From the above prior art analysis, it can be concluded that current state of the art in visual content search methods for images is lacking important requirements on visual search coming from the video domain, as for example reducing temporal redundancy in the video sequence, predicting areas of interest in video pictures from the semantic point of view (e.g., location of faces); fully performing contents analysis, etc. . . .

SUMMARY OF THE INVENTION

Therefore it is the main object of the present invention to provide a method and apparatus for extraction of semantic descriptors from video content, preferably for search and retrieval purpose, which overcomes the above problems/drawbacks.

The basic idea of the present invention is to provide a method and apparatus for extraction of semantic descriptors from video content, comprising the following main components:
- a Key Frame Extractor block, which uses a local descriptors-based approach to select pictures of the incoming video as key frames that are representative of a temporal region of the video which is visually homogeneous;
- a Content Analyser block, which analyses the content of said key frames and classifies image patches of said key frames as semantically interesting or not for said extraction of compact descriptors;
- a Descriptors Extractor block, which extracts said compact descriptors from said selected key frames, and defines a set of surrounding images also on the basis of input received from said Content Analyser block;
- a Temporal Coding block, which multiplexes information about the time points at which said key frames have been extracted by the Key Frame Extractor with said compact descriptors received from said Descriptors Extractor block, obtaining said semantic descriptors.

The obtained semantic descriptors characterise the visual content from the perspective of contained ("shot") objects rather than from the perspective of the particular sequence of video frames. These and further objects are achieved by means of an apparatus and method for extraction of descriptors from video contents described in the attached claims, which form an integral part of the present description.

BRIEF DESCRIPTION OF THE DRAWINGS

The invention will become fully clear from the following detailed description, given by way of a mere exemplifying and non limiting example, to be read with reference to the attached drawing figures, wherein:

FIG. 5 shows examples of a video streams being acquired by an image sensor or by a receiver/decoder apparatus, as well as the video definition in terms of sequence of frames each of which is further composed by four matrices, three for color components and one for the depth (used in 3D video); and FIG. 6 shows a block diagram of a variant of the Descriptors Extractor shown in FIG. 1.

DETAILED DESCRIPTION OF THE PREFERRED EMBODIMENTS

Figure 1:
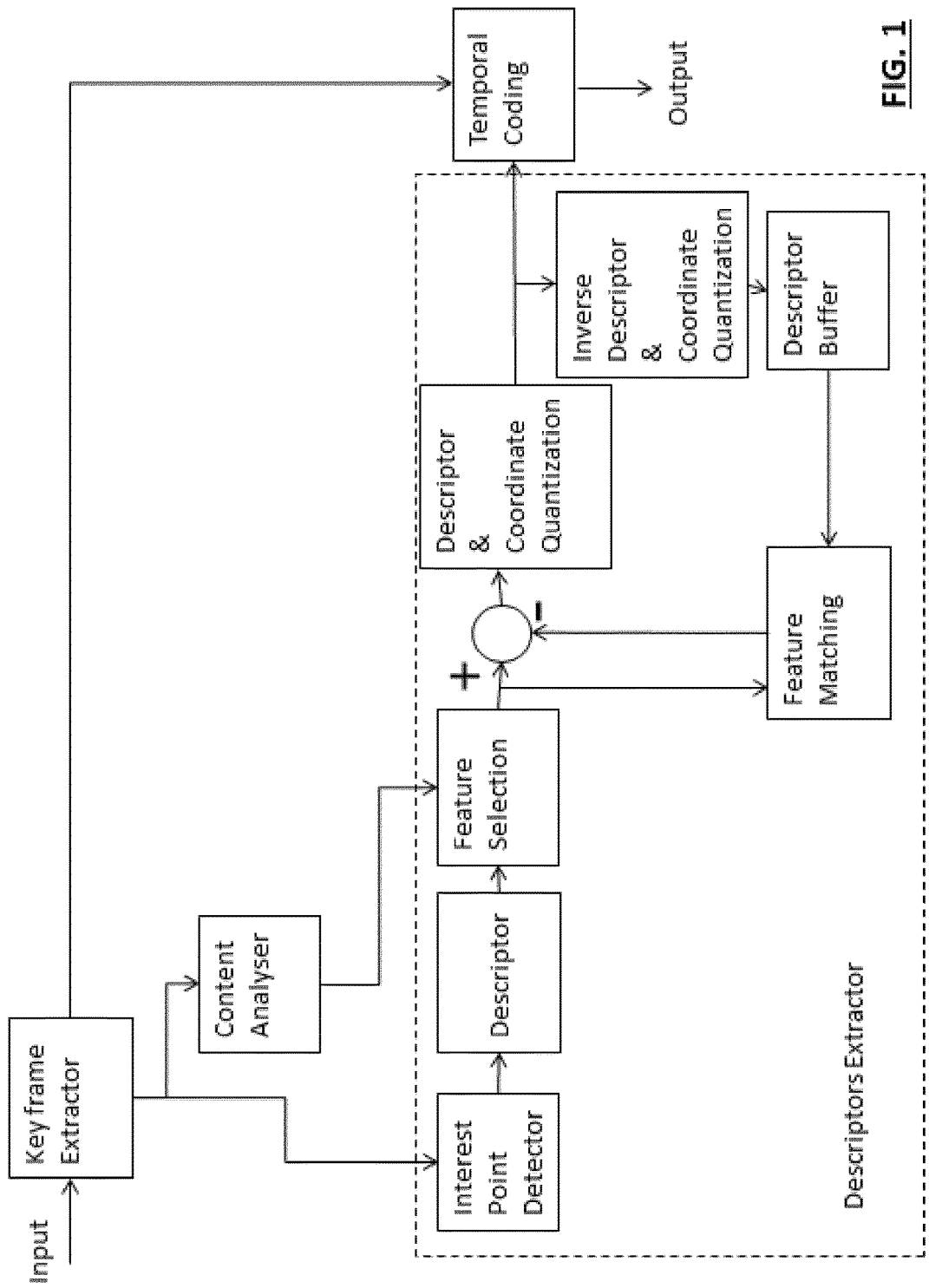
FIG. 1 shows a block diagram of the main components of the method and apparatus in accordance with the invention.

FIG. 1 illustrates the overview of the system, in its main components. Each component will be further detailed below. The overall system can be seen as a machine that process an input video and produces a stream of semantic descriptors.

In the contest of the present invention, the meaning of "video" is extended to cover still images, 2D video stream, and 3D video stream. The latter is intended as a 2D video plus depth for each image. As an example an additional matrix of same size of image contains depth information per pixel, as shown in FIG. 5. Three matrixes contain video pixel information on "Y", "U" and "V" components, per time frame.

In accordance with a basic aspect of the present invention, a method for extraction of semantic descriptors from video content comprises the following main steps:
- a Key Frame Extracting step, applying a local descriptors-based approach to select pictures of the incoming video as key frames that are representative of a temporal region of the video which is visually homogeneous;
- a Content Analysis step, analysing the content of said key frames and classifying image patches of said key frames as semantically interesting or not for said extraction of descriptors;
- a Descriptors Extracting step, extracting compact descriptors from said selected key frames, and defining a set of surrounding images also on the basis of input received from said Content Analysis step;
- a Temporal Coding step, multiplexing information about the time points at which said key frames have been extracted by the Key Frame Extractor with said compact descriptors received from said Descriptors Extracting step, obtaining said semantic descriptors.

Figure 2:
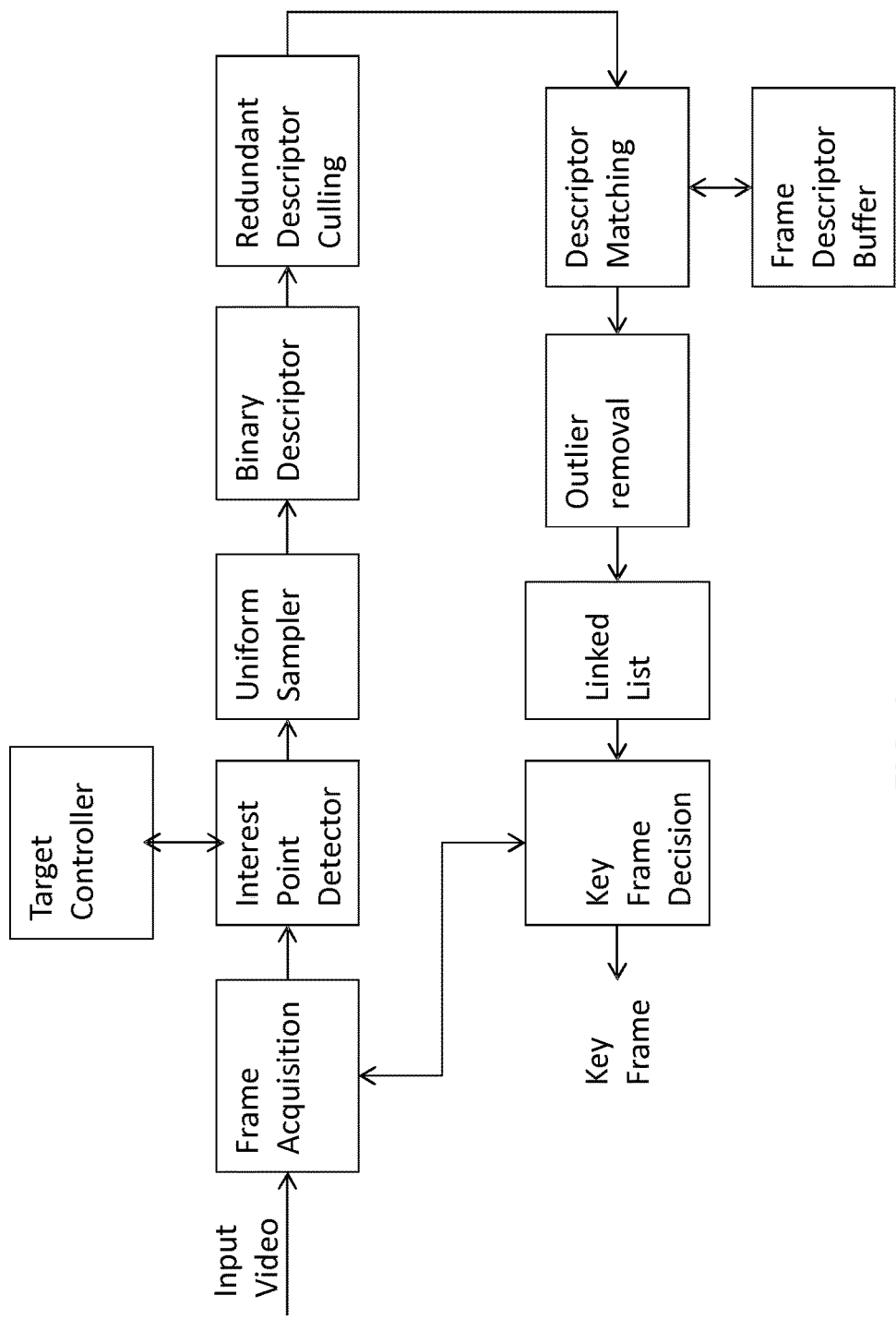
FIG. 2 shows a block diagram of the main components of the block Key Frame Extractor of FIG. 1.

FIG. 2 shows a block diagram of the main components of the block Key Frame Extractor of FIG. 1.

The Key Frame Extractor receives in input a video sequence at a certain frame rate and resolution, composed by a number of frames which are temporally distant of the inverse of the frame rate. At its output, it indicates a frame as "key" when this meets some conditions which depend on the analysis performed on it by the component's blocks.

Frame Acquisition is a block which acquires input images at a certain frame rate, at a given resolution, aspect ratio and bit depth. In the remainder of the description we will assume that luminance components are extracted and forwarded to next processing blocks. However the same algorithmic steps can be applied to any of the component channels of the image or to any linear combination of these.

The block Interest Point Detection processes the images received from the Frame Acquisition block and finds distinctive points. Examples of algorithms that may be applied to detect such distinctive points are described in the paper by Agrawal et al.: "Censure: Center Surround Extremas for Realtime Feature Detection and Matching", in European Conference on Computer Vision. (2008), (especially on paragraphs 2.1, 2.2, 2.3), which is hereby incorporated by reference in its entirety. Described algorithms are the center-surround feature detectors (CenSurE), and a modified version of the upright SURF descriptor (MU-SURF).

Another example is described in Rosten et al.: "Machine Learning for High-Speed Corner Detection", in European Conference on Computer Vision. (2006), (especially on paragraphs 2.1, 2.7), which is hereby incorporated by reference in its entirety.

In addition for 3D video, an example of algorithm that may be applied to detect such distinctive points is described in the paper "Performance Evaluation of 3D Keypoint Detectors", by Federico Tombari et al., International Journal of Computer Vision manuscript No. IIjCV2011, which is hereby incorporated by reference in its entirety.

Interest points, namely represented by their [x, y] coordinates, score and M×N surrounding patch of pixels, are sent to next block Uniform Sampler.

The Target Controller is a block which sets and keeps on target the number of interest points which are computed by the Interest Point Detector. As a non-limiting example, it could iterate the same algorithm multiple times, less or equal to a given cap, by changing detector's thresholds until the target or less is achieved, applying a linear target prediction formula, as non-limiting example as follows:

$$Th\_new = Th\_old \cdot \left( coeff1 + coeff2 \cdot \frac{pointsDetected - pointsTarget}{pointTarget} \right)$$

where at the current iteration/run the computed threshold at the previous iteration/run is multiplied by a value which depends on 2 constants and the deviation from the target set versus the detected ones achieved as result of the previous iteration/run.

Then the Uniform Sampler block collects the number of detected points received from the Interest Point Detector (including coordinates, scores and patches) and groups them into wider R×S sized superblocks, so that the intersection of any couple of R×S superblocks is empty (i.e., they don't overlap with each other). As further functionality of this block, some of the detected interest points which are too close in reciprocal distance or/and with too low score may be discarded.

The non-discarded points are then sent by the Uniform Sampler block to the Binary Descriptor block which in a possible embodiment implements an algorithm as reported in the paper by Calonder M. et al.: "BRIEF: Binary robust independent elementary features", in Proc. of European Conference on Computer Vision (ECCV), Crete, Greece, 2010, (especially on paragraphs 3.1, 3.2), which is hereby incorporated by reference in its entirety. This algorithm uses binary strings as an efficient feature point descriptor, which descriptor relies on a relatively small number of intensity difference tests to represent an image patch as a K-bit binary string. A descriptor similarity can be evaluated using the Hamming distance between these strings.

Another example of algorithm is described in the paper by R. Zabih et al.: "Non-parametric local transforms for computing visual correspondence", in ECCV '94, pages 151-158, 1994 (especially on paragraph 3), which is hereby incorporated by reference in its entirety.

The output of the Binary Descriptor block is a K-bit binary signature associated to each interest point, which is sent to the Redundant Descriptor Culling block.

The Redundant Descriptor Culling block measures the similarity of K-bit binary descriptors, within each R×S superblock, for example using well known techniques, like Hamming distance (http://en.wikipedia.org/wiki/Hamming_distance) or Jaccard index (http://en.wikipedia.org/wiki/Jaccard_index).

The Redundant Descriptor Culling block will cull the binary descriptors below a threshold, with the constraint to keep a uniform spatial distribution in the superblock. Those binary descriptors generated by Binary descriptor stage which survive are stored into the Frame Descriptor Buffer block in order to allow inter-frame descriptor matching, performed by the Descriptor Matching block. This matching is once again performed using Hamming distance or Jaccard index to pair the interest point of two temporally consecutive frames.

Some of the matched and paired descriptors with associated key points may be still not correct so that they would be outliers versus an ordered and coherent expected motion vector fields who captures the underlying natural object motion. Therefore outliers motion vectors are removed by the Outlier Removal block which implements simple post-processing techniques like median filtering of motion vector components or more sophisticated techniques like RANSAC, as described in the paper by Martin A., et al.: "Random Sample Consensus: A Paradigm for Model Fitting with Applications to Image Analysis and Automated Cartography", Comm. of the ACM24 (6): 381-395, June 1981, (especially section IV a), which is hereby incorporated by reference in its entirety (see also http://en.wikipedia.org/wiki/RANSAC).

At this point of the processing, a flow of descriptor pairs and associated interest points between consecutive frames is obtained. This process is repeated for the other frame pairs in temporal order and points, which are labelled with unique identifiers, and are paired between frames and are tracked over time, obtaining a list of interest points, including their descriptors per each frame and their association/correspondence to other interest point and their descriptor belonging to a temporal successive frame and stored in the Linked List block.

If the number of correctly tracked points belonging to the current frame is below a certain number set as a threshold (that can be changed per frame or a group of accordingly to the richness of the information and content represented within the frames), the current frame break the regularity of the whole process (as shown in FIG. 2) and is used to re-initialize it. When this occurs, any combination of the previous frames which enclosed a higher number of tracked points can be labelled as key frame and sent as output of the Key Frame Decision block for further processing.

With reference to FIG. 6, a variant of embodiment of the Descriptors Extractor block is described, applicable in the case when only one key frame needs to be encoded.

Once Key frames are generated by the Key Frame Extractor block, the extraction of features of a burst of frames before the key frame and after the key frame is made, in order to generate more queries to make more robust the retrieval process at the server side From selected Key frames received from the Key Frame Extractor block, interest points are re-detected by an Interest Point Detector block, for example using the same methods as reported into the above mentioned ISO/IEC JTC1/SC29/WG11/W12734 (section 2, compact descriptor extraction) in order to be more tolerant to view point, illumination and scale changes. Another possible method is described in "Distinctive Image Features from Scale-Invariant Keypoints" David G. Lowe, chapters 3, 4, 5. Jan. 5, 2004, which is hereby incorporated by reference in its entirety.

The Interest Point Detector block in the Descriptors Extractor block can avoid determining new interest points in the key frames, and can select the same or a sub-set of the interest points already obtained for those key frames in the Key Frame Extractor block. Then descriptors are extracted by the Descriptor block, and then selected in the Feature Selection block, vectorially-quantized and de-quantized (by Descriptor & Coordinate Quantization and Inverse Descriptor & Coordinate Quantization blocks) using for example the method as described in the above mentioned ISO/IEC JTC1/SC29/WG11/W12734, section 2.1 (Key Point Selection), section 2.2 (TSPCVQ encoding), and section 2.3 (Coordinate coding).

Examples of methods for extracting descriptors relating to 3D video, are described in "Unique Signatures of Histograms for Local Surface Description", by Federico Tombari, et al., ECCV 2010, which is hereby incorporated by reference in its entirety, or in "A COMBINED TEXTURE-SHAPE DESCRIPTOR FOR ENHANCED 3D FEATURE MATCHING", by Federico Tombari, et al., ICIP2011, which is hereby incorporated by reference in its entirety The descriptors extracted from any current key frame are stored in a Descriptor Buffer and then are matched against the descriptors belonging to temporally adjacent key frames. Matching between descriptors can be realised using the known1-NN approach based on the Euclidean metric After the nearest descriptor has been selected, only the difference between them is vectorially-quantized. Each vectorially-quantized descriptor will have x,y coordinates associated, which will undergo to coordinate coding as per the above referred ISO/IEC JTC1/SC29/WG11/W12734.

The output of the Descriptors Extractor is the output of the Descriptor &Coordinate Quantization block, obtaining compact descriptors of key frames. The output is brought to the Temporal Coding block.

With reference to FIG. 1b is, a variant of embodiment of the Descriptors Extractor block is described, applicable in the case when only one key frame needs to be encoded.

In this case, the procedure of descriptors extraction is applied only to one key frame, without the need of the feedback of inverse descriptor &coordinate quantization, storing in the buffer and feature matching. Therefore in this case only the blocks of Interest Point Detector, Descriptor, Feature Selection and Descriptor &Coordinate Quantization are used.

Figure 3:
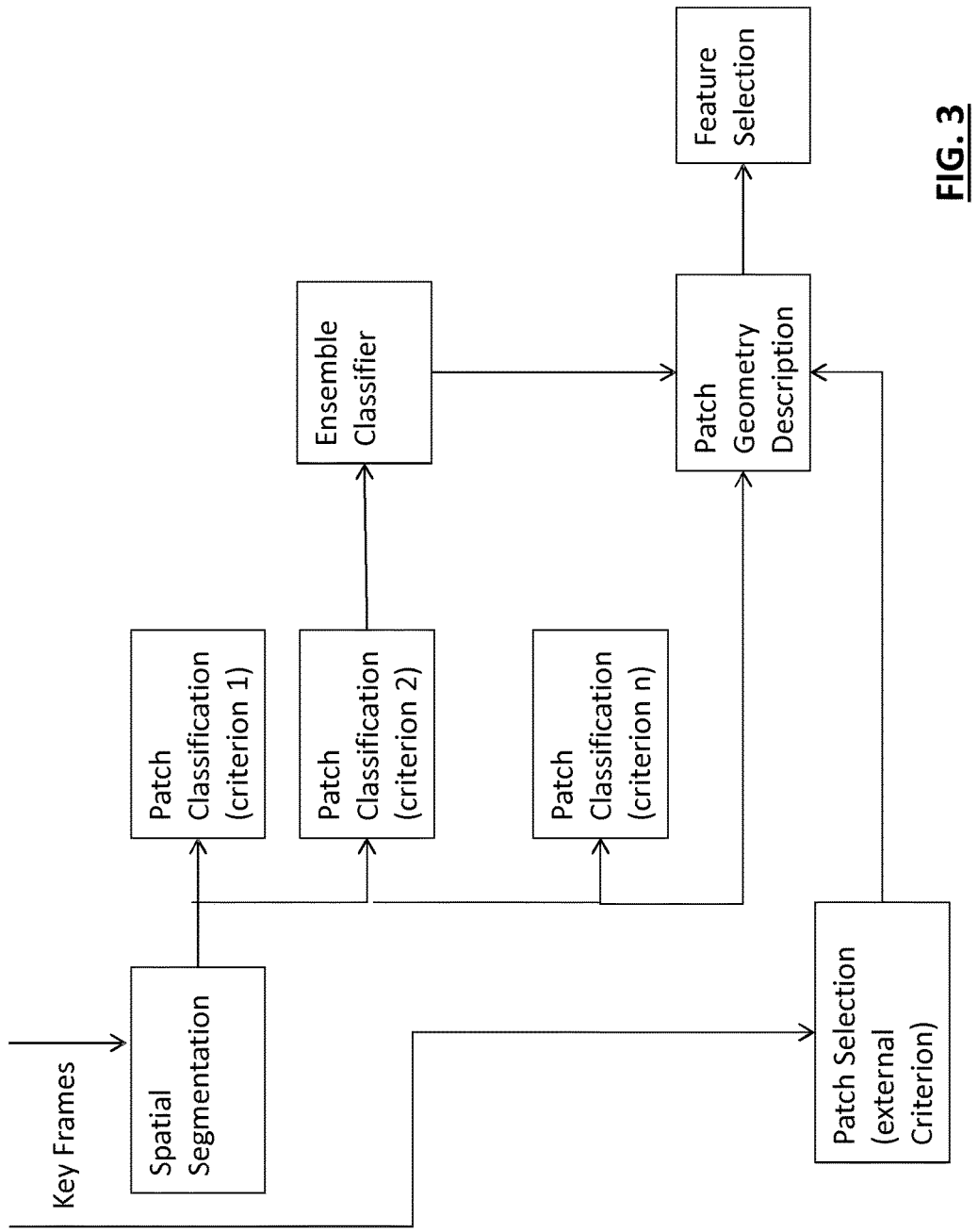
FIG. 3 shows a block diagram of the main components of the block Content Analyzer of FIG. 1.
Figure 3:
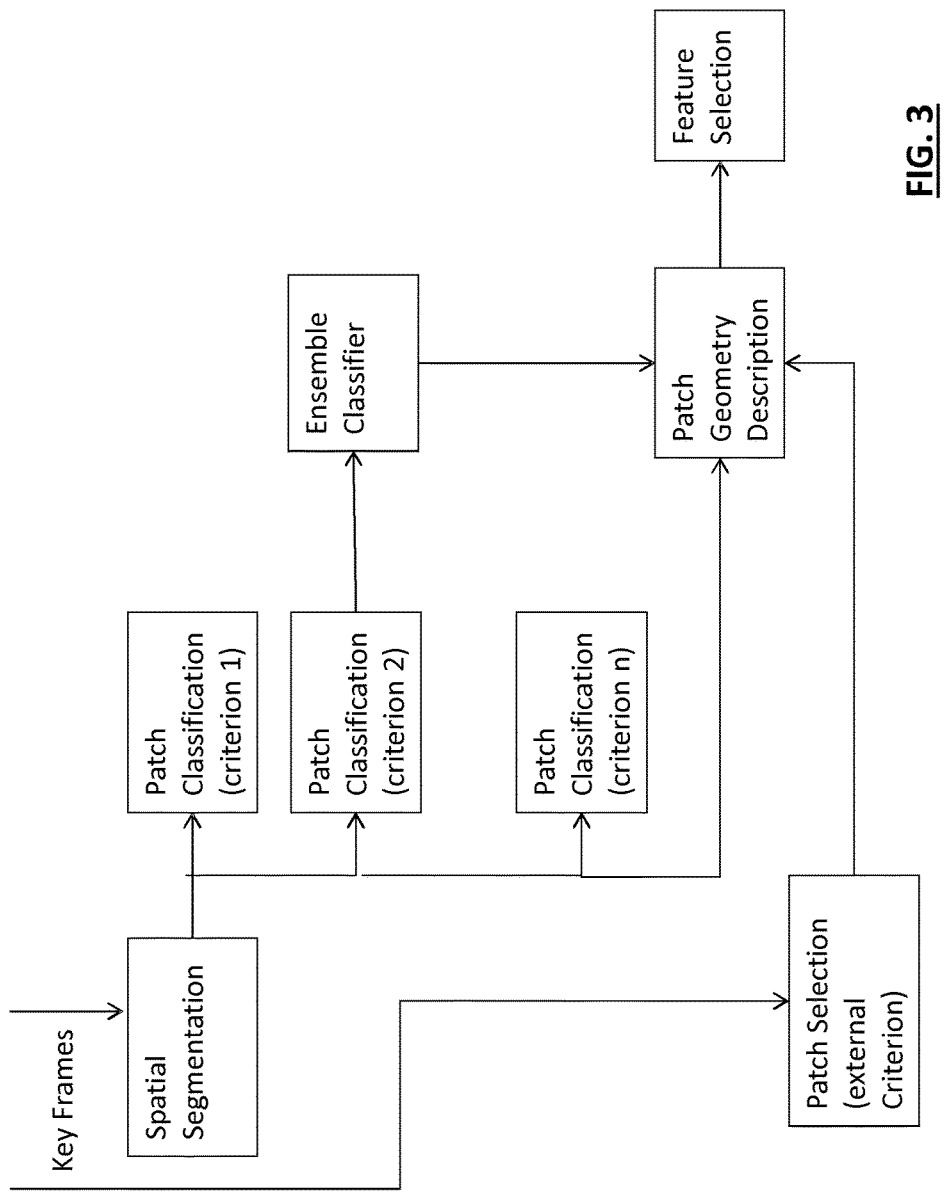

With reference to FIG. 3, an example of embodiment of the Content Analyser block is described herewith.

An additional step of the method of the invention is to analyse the content of the key frames in order to optimize the way with which key points are selected. This optimization is needed in order to concentrate the query content (i.e. the descriptors) in areas of the pictures which are semantically relevant for the user and discarding areas which are less or no informative.

Content analysis is performed using a parallelized spatial patch classification approach, i.e., at first a spatial segmentation is performed on key frames in the Spatial Segmentation block, e.g. by using a number of possible alternative approaches.

A first alternative as the most basic approach provides for segmenting the image with a fixed grid of square blocks of a defined dimension (e.g., 16×16 pixels). This approach considers each block as an independent patch.

A second more complex alternative is based on the first one, and provides for merging blocks of the fixed grid into larger areas based on some block similarity measurement, for example based on global descriptors like colour histograms, edge histograms, dominant colour.

A third alternative provides for implementing segmentation by first detecting images edges through the application of some bidimensional filter (e.g., Sobel filter http://en.wikipedia.org/wiki/Sobel_operator) and then isolating regions of the images which fall inside the edge graphs.

Further alternatives are for example as described in the paper by B. Zhao, et al.: "Image Segmentation with Topic Random Field", ECCV 2010, which is hereby incorporated by reference in its entirety.

The patches as output of the Spatial Segmentation block are classified in a number of parallel Patch Classification blocks.

For example, a Patch Classification block can be optimized in classifying whether or not a patch contains a face, or a logo or a piece of text graphics, all elements that may have a key semantic meaning in queries.

Individual classifiers are typically based on minimally complex mathematics like Support Vector Machines or multilayer feed-forward Neural Networks whose classification models are very compact and minimally memory-demanding.

Individual classifiers also include feature extraction modules which are specific for their task, therefore data of picture patches must be available at the input of each classifier together with their spatial localization in order to perform feature calculation.

Also the whole picture can be considered as a default picture patch, this can be useful for classifiers that exploit patches neighbourhoods to classify patches, or for the special case of Patch classification blocks represented by detectors.

In case of detectors, for example face detectors, on screen text & graphics detectors, logo detectors, spatial segmentation is a side result of detection, and it results in a refinement of the patch localisation provided by the Spatial Segmentation block, which in these cases acts as a pre-processing of the pictures aimed at improving the accuracy and performance of the detectors, which can work on pre-segmented patches instead of on the whole picture. Examples of patch detection and classification techniques that can implement individual patch classification blocks of FIG. 3 are described in the article "Automatic text detection and tracking in digital video", by Huiping Li, Doermann, D. and Kia, O, IEEE Trans. On Image Processing, 9:1 pp. 147-156, which is hereby incorporated by reference in its entirety, or in the article "Logo recognition in video stills by string matching", Proc. of ICIP 2003, by den Hollander, R. J. M.; Hanjalic, A., which is hereby incorporated by reference in its entirety.

Anyway, the result of spatial segmentation is a set of picture patches, e.g. identified by their rectangular bounding boxes or by more precise geometrical characterizations which may include descriptions of region contours, for example through the use of polar coordinates of contours' keypoints.

Another example of approach at describing shapes is described in the paper by D. Zhang, G. Lu, "Generic Fourier Descriptor for Shape-based Image Retrieval", Third CIRP International Seminar on Intelligent Computation in Manufacturing Engineering—ICME 2002, Ischia, Italy, 2002, which is hereby incorporated by reference in its entirety.

Further examples of equivalent approaches are described in the paper by D. Zhang, G. Lu, "A Comparative Study of Three Region Shape Descriptors", Proc. of the Sixth Digital Image Computing—Techniques and Applications (DICTA02), Melbourne, Australia, pp. 86-91, 2002, which is hereby incorporated by reference in its entirety.

After the individual Patch Classification blocks have classified patches following a set of independent criteria (see FIG. 3), the overall Patch classification is performed using an ensemble classification approach implemented by the Ensemble classifier block. Ensemble classifier block works by combining outputs of several parallel Patch Classification blocks which are optimized in detecting specific semantic aspects of the picture content.

Each Patch Classification block (or classifier) can have one out of two possible roles—positive or negative—, depending on whether the classification has a positive effect on the semantic relevance of the corresponding patch or not. For example if the classification criterion is based on the presence of faces, then the classifier has a positive role since it is assumed that faces have a strong semantic relevance in pictures. On the other hand, a logo classifier can be used as a negative enforcer when specific logos (e.g. broadcasters' logos) are detected in specific peripheral positions of the picture (e.g., bottom-right). Independently from the nature, complexity and number of the classifiers, each classifier output is composed of two contributions: a binary classification decision and a real number representing the classification confidence.

The role of the Ensemble Classifier block is then to provide as output a probability estimation about the relevance of each of the input patches. This is done by a weighted linear combination of the classification decisions using the classification confidence scores as weights. Weights of classifiers having negative roles have to be taken with the negative sign in the ensemble sum. This approach has the advantage of not requiring any memory to perform the ensemble calculation.

A more sophisticated approach at ensemble classification can be also used, as described in the paper by W. Nick Street and Y. S. Kim "A Streaming Ensemble Algorithm (SEA) for Large-Scale Classification", KDD 01, which is hereby incorporated by reference in its entirety.

By using this parallelized spatial patch classification approach, and the ensemble classifier, each individual patch is therefore associated to a probability of being semantically relevant for the retrieval purpose. A threshold is associated to this probability so that the subsequent Patch Geometry Description block works only on those patches, classified by the Spatial Segmentation block, which exceed this threshold.

Differently from the description of patch localization performed by the Spatial Segmentation block, which is targeted at identifying regions of the pictures with an as higher as possible accuracy for the subsequent classification task, the Patch Geometry Description block works on the patches using a logic closer to retrieval.

Therefore, in order to minimize the complexity of the feature selection task, the Patch Geometry Description block may use only rectangular bounding boxes or ellipses to represent areas of the picture from which to select the features extracted by the extraction pipeline. Furthermore, an important task of this block is to merge the different patches coming out of the classification step into larger patches, in order to minimise the number of patches descriptions to use. For example, if two positively classified patches are completely included one into the other, the Patch Geometry Description block will select only the larger one for the output description. As another example, if two positively classified patches share a boundary, the Patch Geometry Description block will output the result of the merge operation between the two patches.

The output of the Patch Geometry Description block is therefore a set of geometrical descriptions of the patches that have been classified as those from which to select keypoints by the Feature Selection block. The set of geometrical descriptions must be interpreted by the Feature Selection block as the logical union of elementary geometrical patches like rectangles and ellipses. Each elementary patch can be described according to its minimal information needed to represent it geometrically on a plane. For example for a rectangle the coordinates of two opponent vertices, for an ellipse the three coefficients a, b, c, x0, y0 characterising its equation expression $a(x-x0)^2+b(y-y0)^2=c$. The overall output of this block can be thus regarded as a list of tuples <t, C> where t is the type of the patch (e.g., "rectangle" or "ellipse") and C is the vector of coordinates, given accordingly to the type.

Preferably, in parallel to the above described content-analysis based pipeline, it is also possible that the user selects a patch of his/her interest. A further Patch Selection (external criterion) block is provided to the purpose, receiving the key frames from the Key Frame extractor block. Since this criterion (user selection) has always a pre-emptive effect on retrieval, user-selected patches are always selected for patch geometry encoding, and therefore are fed to the Patch Geometry Description block as a further elementary patch.

As a variant, it is possible to always discard the output of the automatic classification pipeline whenever a user-defined input is present, in order to be even more selective.

The Patch Geometry Description block outputs are input to the Feature Selection block (also described with reference to FIG. 1 above). The latter uses the information coming from the Patch Geometry Description block to filter extracted descriptors that are outside the geometrical union of the input patches.

An available alternative is that the Content Analyser block is disabled or classifiers are not activated: in this case the default patch corresponding to the whole frame is always transferred to the Feature Selection block.

Different weighting schemes can be used in the Feature Selection block, in order to magnify or lower the relative importance of the patches identified by the Spatial Segmentation block and subsequently classified as interesting by the Ensemble Classifier block w.r.t. the user-selected ones. An example of implementation may use the user selected patch in logical pixel-wise AND with the other patches so that it is always pre-emptive and exclusive. Another approach could work by influencing internal selection criteria of the Feature Selection block by re-determining the probability density function of extracted key-points using the input probabilities of the individual patches, and considering the user-selected patches always with maximal probability (=1).

After the key frames have been selected and temporally enriched, interesting and/or user-selected patches of the key frames have been communicated to the Feature Selection block, and this has operated its internal selection choices, a flow of descriptors is generated at the output of the chain (block Location Coding) so that groups of descriptors are associated to specific Key Frames.

In order to apply advanced retrieval functionalities for video content, which take into account not only spatial matching of individual pictures but also how these matching inter-relate along the video timeline, it is necessary to encode the temporal position of descriptors.

This is done in the Temporal Coding block (FIG. 1) exploiting the temporal distance of extracted Key Frames. Temporal positions are represented however in a relative manner, so that to cover situations in which videos have been edited w.r.t. frame rate (e.g., global frame rate conversion) and basic rough cut operations (elimination of shots).

An example of the algorithm performed by the Temporal Coding block works as follows:
1. Start with the first key frame K(0) having associated the compact descriptors D(0) extracted by the Descriptors Extractor block. Since K(0) is the first key frame, the temporal distance from the previous Key Frame, L(0), is undetermined.
2. i=0
3. Output D(0)
4. for each new key frame K(i) of length L(i), having descriptor set D(i)
   a. if i>1
      i. Calculate T(i)=L(i)/L(i−1)
      ii. optionally output L(i) (length resynch), depending on some criterion (e.g. one output every 10 seconds of processed material)
      iii. Output T(i)D(i)
   b. else if i=1
      i. Output L(1)D(1)
5. end for The advantage of this approach w.r.t. plain encoding of time codes of key frames is manifold:
original time distances between key frames can be recovered from the stream once that the first L(k) is detected by sequentially applying the following formula:

$$L(k+1)=L(k)T(k+1)$$

All possible sub-segments of the material can be used as an independent query against the same tree-structured index at the retrieval side, and these queries can be run in parallel.
Queries are robust w.r.t. global frame rate conversion
Queries are robust w.r.t. key frame elimination/addition, provided that at the server side partial results are all indexed for a certain database video and these can be retrieved separately.

The output of the Temporal Coding block are semantic descriptors as a multiplex of information about the time points at which key frames have been extracted and said compact descriptors of key frames.

This output enables proximity search that takes into account temporal search of descriptors.

An example of output of the Temporal Coding block for 8 keyframes with length resynch at the sixth keyframe is:
D(0)L(1)D(1)T(2)D(2)T(3)D(3)T(4)D(4)L(5)T(5)D(5)T(6)D(6)T(7)D(7)

The reconstruction of the keyframes time distances sequence I(n)={I(1) . . . I(7)} works as follows:
I(1)=L(1)
I(2)=T(2)L(1)=T(2)I(1)
I(3)=T(3)I(2)=T(3)T(2)I(1)
I(4)=T(4)I(3)=T(4)T(3)T(2)I(1)
I(5)=L(5) (length resynch)
I(6)=T(6)I(5)=T(6)I(5)
I(7)=T(7)I(6)=T(7)T(6)I(5)

The present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

By means of the present invention, a number of advantages are achieved.

The descriptor encoding is able to efficiently encode video sequences, and also still images, therefore exploiting temporal information redundancy, achieving a more compact burst of queries.

The method achieves better precision-recall performances due to the fact that a burst of frame's descriptor is embedded into the bit-stream.

The method is able to select more efficiently semantic descriptors due the information content enclosed in particular regions of interest automatically detected.

The method is able to encode relevant key frames where information is particularly rich and temporally persistent.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

Figure 4:
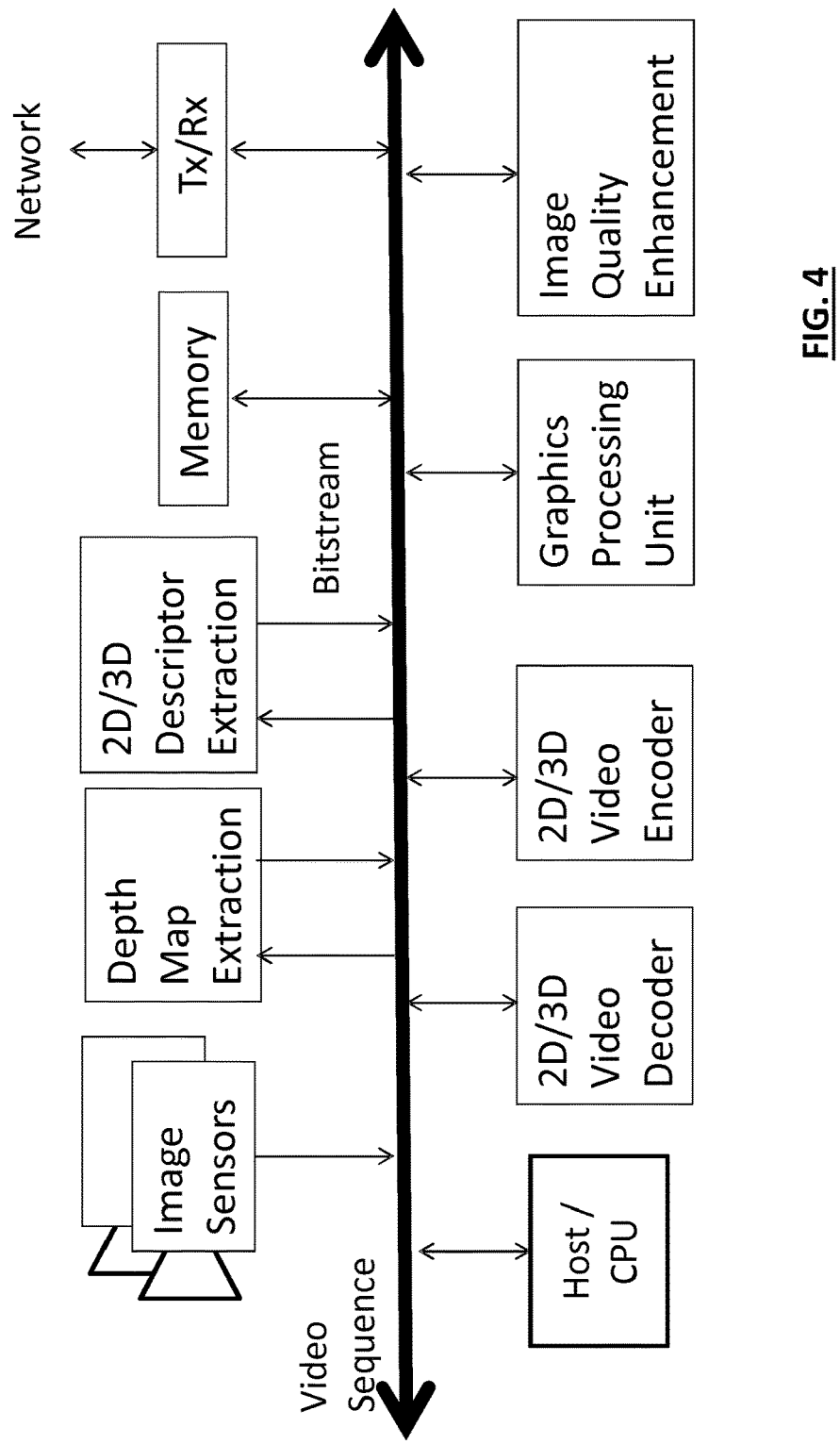
FIG. 4 shows a block diagram enclosing a superset of bricks from which to derive an application specific circuit implementing the method of the invention by selecting a sub set of those bricks.

An example of assembly of apparatus according to the invention is an application processor as depicted in FIG. 4. It encloses a super set of building blocks from which a specialized processor for a specialized application like mobile, digital TV, Set Top Box, Imaging or other applications can be derived by selecting some of those blocks, to build the final apparatus.

The processor that includes (on the same or separated chipset) circuitry implementing the method for extracting semantic descriptors according to the invention is the one identified as "2D/3D Descriptor Extraction Pipeline" Input video can come from any source, like for example one or more Image sensors, 2D/3D cameras, storing devices of video clips or still images, a video decoder or an image quality improvement stage etc. For 3D video a further block of Depth extraction may be necessary, as well as 2D/3D Video Decoder and Encoder. Other components can be a GPU (Graphics Processing Unit), one or more host CPUs.

Further implementation details will not be described, as the man skilled in the art is able to carry out the invention starting from the teaching of the above description.

The invention claimed is:
1. A method for extraction of descriptors from video content, said descriptors being semantic descriptors adapted for a visual search of multiple video contents, the method comprising the following steps:
receiving an incoming video stream at a machine that includes a processor, wherein the processor is configured to perform:

a Key Frame Extracting step that includes applying a local descriptors-based approach to select pictures of an incoming video as key frames that are representative of a temporal region of the video which is visually homogeneous for the visual search of the multiple video contents;

a Content Analysis step that includes analyzing content of said key frames and classifying image patches of said key frames as semantically interesting or not for said extraction of descriptors adapted for the visual search of the multiple video contents, said image patches having a key semantic meaning in queries for the visual search of the multiple video contents;

a Descriptors Extracting step that includes extracting compact descriptors from said selected key frames, and defining a set of surrounding images also on the basis of input received from said Content Analysis step;

a Temporal Coding step that includes multiplexing information about the time points at which said key frames have been extracted in said Key Frame Extracting step with said compact descriptors extracted in said Descriptors Extracting step, to obtain semantic descriptors characterizing said video content on the basis of contained objects for the visual search of the multiple video contents, said semantic descriptors comprising a multiplex of information about time points at which the key frames have been extracted and about said compact descriptors of the key frames, wherein the semantic descriptors establish relationships amongst the key frames along a video timeline of the incoming video stream; and an outputting step that includes outputting a stream of semantic descriptors for the incoming video stream that characterize the incoming video stream based on the contained objects, wherein the semantic descriptors account for spatial matching of individual pictures and of how these pictures inter-relate along the video timeline.

2. The method according to claim 1, wherein said Key Frame Extracting step comprises the following steps:

detecting Interest Points in said input images represented by their [x, y] coordinates, score and M×N surrounding patch of pixels;

setting and keeping on target the number of said interest points;

collecting said number of interest points, and grouping them into wider R×S sized superblocks, so that the intersection of any couple of R×S superblocks is empty;

associating, binary strings within said superblocks to said interest points;

matching within said superblocks, said binary strings, culling those under a threshold of similarity, keeping those above the threshold as descriptors;

inter-frame matching said kept descriptors;

removing outlier descriptors from said kept descriptors, being outlier versus an ordered and coherent expected motion vector fields who captures the underlying natural object motion;

repeating the previous steps for consecutive frames, obtaining a linked list of interest points including their descriptors per each frame and their association/correspondence to other interest points and their descriptor belonging to a temporal successive frame;

determining if a candidate frame is a key frame by a decision based on comparing the number of common interest points into linked list associated to the candidate frame to one or more thresholds.

3. The method according to claim 2, wherein said Content Analysis step comprises the following steps:

spatially segmenting said determined key frames, obtaining a set of picture patches identified by geometrical characterizations;

classifying the spatially segmented picture patches in a number of parallel patch classification steps;

combining said classified picture patches by an ensemble classification step, obtaining as output a probability estimation about the relevance of each of the input picture patches;

associating a threshold to said probability;

geometrically describing said picture patches exceeding said threshold, representing areas of said picture patches as set of geometrical descriptions, from which to select key points.

4. The method according to claim 3, wherein said Descriptors Extracting step comprises the following steps:

detecting Interest Points in said determined key frames of consecutive frames or in patches of pixels around interest points as specified by said linked list;

extracting descriptors from said detected interest points;

selecting features from said extracted descriptors of said detected interest points;

matching said extracted descriptors against extracted descriptors selected from frames temporally adjacent to the current key frame, and selecting nearest descriptors;

vectorially quantizing the relative differences between said nearest extracted descriptors;

coding coordinates of said vectorially quantized descriptors, obtaining said compact descriptors.

5. The method according to claim 3, wherein said Descriptors Extracting step comprises the following steps:

detecting Interest Points in said determined key frames of one frame or in patches of pixels around interest points as specified by said linked list;

extracting descriptors from said detected interest points;

selecting features from said extracted descriptors of said detected interest points;

vectorially quantizing the relative differences between said extracted descriptors;

coding coordinates of said vectorially quantized descriptors, obtaining said compact descriptors.

6. The method according to claim 4, wherein in said Descriptors Extracting step, the detected interest points in said key frames are the same or a sub-set of the interest points obtained for said key frames in the Key Frame Extracting step.

7. An apparatus for extraction of descriptors from video content, said descriptors being semantic descriptors adapted for a visual search of multiple video contents, the apparatus comprising:

a processor, the processor configured to execute:

a Key Frame Extractor that applies a local descriptors-based approach to select pictures of the incoming video as key frames that are representative of a temporal region of the video which is visually homogeneous for the visual search of the multiple video contents;

a Content Analyser that analyzes content of said key frames and classifying image patches of said key frames as semantically interesting or not for said extraction of descriptors adapted for the visual search of the multiple video contents, said image patches having a key semantic meaning in queries for visual search of the multiple video contents;

a Descriptors Extractor that extracts compact descriptors from said selected key frames, and defining a set of surrounding images also on the basis of input received from said Content Analyser;

a Temporal Coder that multiplexes information about the time points at which said key frames have been extracted by the Key Frame Extractor with said compact descriptors received from said Descriptors Extractor to obtain semantic descriptors characterizing said video content on the basis of contained objects for the visual search of the multiple video contents, said semantic descriptors comprising a multiplex of information about time points at which the key frames have been extracted and about said compact descriptors of the key frames, wherein the semantic descriptors establish relationships amongst the key frames along a video timeline of the incoming video stream;

output a stream of semantic descriptors for the incoming video stream that characterize the incoming video based on the contained objects, wherein the semantic descriptors account for spatial matching of individual pictures and of how these pictures inter-relate along the video timeline.

8. The apparatus according to claim 7, wherein said Key Frame Extractor comprises:

a detector of Interest Points in said input images represented by their [x, y] coordinates, score and M×N surrounding patch of pixels;

a setting unit, setting and keeping on target the number of said interest points;

a collecting unit collecting said number of interest points, and grouping them into wider R×S sized superblocks, so that the intersection of any couple of R×S superblocks is empty;

an associating unit, associating said binary strings within said superblocks to said interest points;

a matching unit matching within said superblocks, said binary strings, culling those under a threshold of similarity, keeping those above the threshold as descriptors, and inter-frame matching said kept descriptors;

a remover unit removing outlier descriptors from said kept descriptors, being outlier versus an ordered and coherent expected motion vector fields who captures the underlying natural object motion;

a linker unit obtaining a linked list of interest points including their descriptors per each frame of a number of consecutive frames, and their association/ correspondence to other interest points and their descriptor belonging to a temporal successive frame;

a decision unit, determining if a candidate frame is a key frame by a decision based on comparing the number of common interest points into linked list associated to the candidate frame to one or more thresholds.

9. The apparatus according to claim 8, wherein said Content Analyser comprises:

a segmentation unit, spatially segmenting said determined key frames, obtaining a set of picture patches identified by geometrical characterizations;

a classifying unit, classifying the spatially segmented picture patches in a number of parallel patch classification steps;

a combining unit, combining said classified picture patches by an ensemble classification step, obtaining as output a probability estimation about the relevance of each of the input picture patches;

an association unit, associating a threshold to said probability;

a describing unit, geometrically describing said picture patches exceeding said threshold, representing areas of said picture patches as set of geometrical descriptions, from which to select key points.

10. The apparatus according to claim 9, wherein said Descriptors Extractor comprises:

a detector of Interest Points in said determined key frames of consecutive frames or in patches of pixels around interest points as specified by said linked list;

an extracting unit, extracting descriptors from said detected interest points;

a selecting unit, selecting features from said extracted descriptors of said detected interest points;

matching said extracted descriptors against extracted descriptors selected from frames temporally adjacent to the current key frame, and selecting nearest descriptors;

a quantizer vectorially quantizing the relative differences between said nearest extracted descriptors;

a coder coding coordinates of said vectorially quantized descriptors, obtaining said compact descriptors.

11. The apparatus according to claim 10, wherein said Descriptors Extractor comprises:

a detector of Interest Points in said determined key frames of one frame or in patches of pixels around interest points as specified by said linked list;

an extracting unit, extracting descriptors from said detected interest points;

a selecting unit, selecting features from said extracted descriptors of said detected interest points;

a quantizer vectorially quantizing the relative differences between said extracted descriptors;

a coder coding coordinates of said vectorially quantized descriptors, obtaining said compact descriptors.

12. The apparatus according to claim 10, wherein in said Descriptors Extractor, the detected interest points in said key frames are the same or a sub-set of the interest points obtained for said key frames in the Key Frame Extractor.

13. A non-transitory computer readable medium having a program recorded thereon, said computer readable medium comprising computer program code means adapted to perform all the steps of claim 1, when said program is run on a computer.

* * * * *